== 2,958,676 ==
NAPHTHALENE-FORMALDEHYDE CONDENSATION PRODUCTS

Hans Krzikalla, Heidelberg, Germany, and Frederic van Taack Trakranen, deceased, late of Ludwigshafen (Rhine), Germany, by Felicitas van Taack Trakranen, sole heir-at-law, Ludwigshafen (Rhine), Germany, assignors to Badische Anilin- & Soda-Fabrik Aktiengesellschaft, Ludwigshafen (Rhine), Germany No Drawing. Filed Nov. 26, 1957, Ser. No. 698,934

7 Claims. (Cl. 260—67)

This invention relates to the production of naphthalene-formaldehyde condensation products, and in particular, resinous condensation products suitable for lacquers, or lacquer resins. Baeyer et al observed that it is possible to react naphthalene and formaldehyde under the influence of strong acids, as reported in Berichte, vol 7 (1874), page 1605. The dinaphthyl methane produced was, however, unusable for the production of lacquers because of its low melting point. It was first proposed in German Patent 207,743 to produce high molecular weight condensation products from naphthalene and formaldehyde, the starting materials being converted in certain quantitative proportions and in the presence of rather concentrated acids. The condensation products have a higher softening point, but they are only imperfectly soluble in benzene and similar solvents.

Condensation products of better solubility are obtained by the process of German Patent 349,741, in which naphthalene and formaldehyde are condensed in the presence of sulfuric acid of below 60% concentration. However, resins are formed which have a high oxygen content and are little suited for the production of lacquers in this form because of their low chemical stability. It is also disadvantageous that the convension is only incomplete, so that an expensive removal of the unchanged naphthalene from the resin is necessary. We have attempted to continue the condensation with splitting off of water, non-uniform lumpy products then form, when contain more highly condensed products and still unconverted naphthalene.

It is an object of the invention to obviate the difficulties that occur in the condensation of naphthalene and formaldehyde with sulfuric acid and to provide a new and improved process for producing resinous naphthalene-formaldehyde condensation products, which overcomes the prior disadvantages.

Another object is to produce new very stable resinous condensation products which are oxygen-free or have a low oxygen content.

An additional object is to produce stable, high softening point naphthalene-formaldehyde resins which are yet soluble in lacquer solvents, particularly aromatic hydrocarbons, such as benzene and toluene.

A further object is to produce condensation products which are free of unconverted naphthalene and therefore require no purification. These and other objects of the invention will be apparent upon reference to the specification.

It has now been found in accordance with the invention that clear, extremely stable resins which are suitable for lacquers are produced by completing the condensation of naphthalene and formaldehyde in the presence of a substantially unreactive water-immiscible organic liquid solvent for the condensation products. The resins contain a maximum of 3% by weight of oxygen, and preferably a maximum of about 1%. Clear resins are readily obtained which have an oxygen content between about 0.2% and 1% and which are prefectly soluble in aromatic hydrocarbons, such as benzene and toluene.

In the preferred process of the invention, the reactants are condensed in the molar ratio of about 1 mol of naphthalene to about 1 to 1.5 mols of formaldehyde. The reaction takes place in aqueous acidic medium, preferably having a sulfuric acid concentration of about 20% to 60%, further preferably about 45% to 55%. The condensation is carried out under vigorous stirring at a temperature of about 50° C. to 100° C., perferably between 70° C. and 100° C. The organic liquid solvent may be present from the start of the reaction, but it is only necessary that the condensation be completed in the presence of the solvent. The organic solvent is thus incorporated in the reaction medium at least toward the end of the condensation, but prior to the formation of bodies or lumps insoluble in the reaction medium, which would otherwise be produced.

The condensation is continued, with the latter part in the presence of the solvent, until the oxygen content of the condensation products is reduced to a maximum of 3% by weight, preferably to a maximum of 1%. The condensation is also continued until the condensation products are still infinitely soluble in toluene in any proportion.

The condensation is continued until the condensation products are no longer infinitely soluble in butyl acetate but have only limited solubility therein. Thus, the products should yield only more concentrated clear solutions, i.e. solutions containing about 15% and more of resin, by weight, from which solutions, the resin is precipitated with dilution below 15% concentration. The condensation products thus produced have a softening point which may vary from about 60° C to 110° C. The condensation is preferably continued until the products soften above about 75° C. to 90° C.

By at least completing the condensation in the presence of an effective amount of the organic liquid solvent, a homogeneous resin phase is obtained, whereby it becomes possible to continue the condensation until high softening point resins develop which are oxygen-free or low in oxygen, without the separation of hard, insoluble lumps of resin, which are incapable of further reaction and render stirring impossible. The resins contain no unconverted naphthalene, so that its removal is no longer necessary.

The new process produces new stable resins which are substantially free of or low in oxygen, are soluble in toluene, and have but limited solubility in butyl acetate. They have a softening point above about 60° C. to 110° C., preferably above 75° C. The solubility conditions control the upper limit of softening point. On the other hand, condensation products which are too highly condensed and no longer soluble in lacquer solvents are not formed.

The organic solvents suitable for the new process are immiscible with water, and are substantially unreactive or inert in the reaction medium, particularly being unreactive with formaldehyde, under the conditions of the process. The organic liquid solvents are preferably hydrocarbons or halogenated hydrocarbons. The solvents are preferably aromatic compounds, such as benzene, toluene, xylene, ethylbenzene, halogenated aromatic hydrocarbons, such as halobenzene, and the like. Aliphatic solvents may also be employed, such as ethylene chloride, trichloroethylene, carbon tetrachloride.

The quantity of solvent may be varied within wide limits. It is preferable to incorporate an amount of solvent at least sufficient to produce a viscous liquid resin phase. It is further preferred to add just sufficient solvent to form a viscous liquid resin phase, since greater additions of solvent reduce the speed of condensation. It is generally preferred to provide in the reaction medium a quantity of about 20 to 40 parts by weight of organic solvent per 100 parts by weight of naphthalene. As described above, the solvent may be added at the start of the condensation, or it may be added after the condensation is fairly well advanced.

It is especially advantageous to use as the organic liquid solvent, a solvent which may be used with the condensation product for lacquer purposes. Thus, tolene is employed when it is intended to use the resin product in toluene solution. Operating in this manner, it is only necessary after completion of the condensation, to separate the aqueous acid layer, add more toluene, wash the condensation product solution in toluene with a neutral solution or water, and establish the desired lacquer concentration by simple distillation of a small quantity of toluene, while removing the residual water from the solution by azeotropic distillation, the water distilling with the first toluene distillate fractions.

When it is not desired to use the same solvent for the lacquers as employed in the condensation, the reaction product solution is washed with a neutral solution or water, and the solvent is removed by distillation.

The resins and their solutions are especially well suited for the production of corrosion-resistant coatings.

The following examples are given as illustrative of the invention, but it will be understood that the invention is not limited thereto nor to the illustrative components, proportions, conditions and procedures given therein. In the examples, the proportions are by weight.

*Example 1*

In an enamelled or lead-lined tank, equipped with a reflux condenser, there are added to 500 parts of a 30% formaldehyde solution, under stirring, 390 parts of 95% sulfuric acid, while care is taken, if necessary by cooling, that the temperature does not exceed 80° C. The resulting sulfuric acid concentration is 50%, owing to the water introduced with the formaldehyde. 640 parts of pure naphthalene are then added and, thereupon, 160 parts of toluene. The temperature is then raised, under stirring, until the mass begins to boil and a visible reflux starts. Stirring and heating are continued for about 48 hours.

The resin that develops forms with the toluene a viscous layer floating at the top, which does not solidify, so that even when the reaction is far advanced, it is still possible to stir well.

The preparation is then cooled to about 80° C., and 1,200 more parts of toluene are added. After homogenization of the organic phase, the stirrer is turned off and the contents of the tank are allowed to stand at 60° C. to 80° C. The toluene layer containing resin separates at the top, so that the lower, aqueous acid layer can be run off. The toluene layer is washed approximately three times with water until it is free of acid. It is then brought to a boil, in which process first aqueous and then non-aqueous toluene is distilled over. The distillation is continued until the contents of the boiler have attained a resin concentration of 40 parts of solid resin in 60 parts of toluene.

The cooled solution that is run off can be used as lacquer. It contains 760 parts of solid resin. The solid resin has a softening point of 80° C. and oxygen content of 1% and has excellent solubility in toluene and benzene. The lacquer is resistant to mineral acids and many organic acids, and also to alkali and alkaline earth metal hydroxides. It is extremely well suited for corrosion-resistant coatings on metals.

*Example 2*

As described in Example 1, to 650 parts of 30% formaldehyde there are added carefully under stirring 400 parts of 95% sulfuric acid. The resulting sulfuric acid concentration is 44.4%. After the mixture has been heated to 80° C., 640 parts of pure naphthalene are added. Thereupon, the mixture is heated under stirring for 30 hours with a weak reflux.

200 parts of monochlorobenzene are then added, and heating is continued in the same manner (about 10 hours) until a sample after removal of the solvent by distillation shows an oxygen content of about 1%, is clearly soluble in toluene, and also dissolves readily in 4 to 5 times its weight of butyl acetate, but is precipitated with the addition of further amounts of butyl acetate, when the concentration begins to become lower than 15%.

300 parts of chlorobenzene are then added and the resin solution is processed to recover the product as in Example 1.

A resin is obtained with an oxygen content of 0.8% and a softening point of 88° C., which is suitable for the production of lacquers which furnish excellent resistance to corrosion.

We claim:

1. A resinous naphthalene-formaldehyde condensation product having less than 3% by weight oxygen and a softening point between 60° C. and 110° C., the molar ratio of naphthalene to formaldehyde being about 1:1 to 1:1.5, respectively, said condensation product being soluble in toluene in all proportions and having limited solubility in butyl acetate, said condensation product being produced by condensing at a temperature in the range of 50–100° C. naphthalene and formaldehyde at a molar ratio in the range of about 1:1 to 1:1.5, respectively, in a reaction mixture containing 20–60% strength sulfuric acid aqueous solution until the oxygen content of the produced naphthalene-formaldehyde resin is not greater than 3% by weight and said resin has a softening point in the range of 60–110° C., is soluble in toluene in all proportions and has only limited solubility in butyl acetate, the condensation being completed with the reaction mixture containing sufficient water-immiscible, organic solvent for the naphthalene-formaldehyde condensation resin to provide a liquid resin phase, which solvent is non-reactive with the reaction mixture at the reaction conditions enumerated and is selected from the group consisting of hydrocarbons and halogenated hydrocarbons.

2. A resinous naphthalene-formaldehyde condensation product having 0.2–1% by weight oxygen and a softening point between 60° C. and 110° C., the molar ratio of naphthalene to formaldehyde being about 1:1 to 1:1.5, respectively, said condensation product being soluble in toluene in all proportions and having limited solubility in butyl acetate, said condensation product being produced by condensing at a temperature in the range of 50–100° C. naphthalene and formaldehyde at a molar ratio in the range of about 1:1 to 1:1.5, respectively, in a reaction mixture containing 20–60% strength sulfuric acid aqueous solution until the oxygen content of the produced naphthalene-formaldehyde resin is not greater than 3% by weight and said resin has a softening point in the range of 60–110° C., is soluble in toluene in all proportions and has only limited solubility in butyl acetate, the condensation being completed with the reaction mixture containing sufficient water-immiscible, organic solvent for the naphthalene-formaldehyde condensation resin to provide a liquid resin phase, which solvent is non-reactive with the reaction mixture at the reaction conditions enumerated and is selected from the group consisting of hydrocarbons and halogenated hydrocarbons.

3. A process for producing stable resinous naphthalene-formaldehyde condensation products suitable for lacquers which comprises condensing at a temperature in the range of 50–100° C. naphthalene and formaldehyde at a molar ratio in the range of about 1:1 to 1:1.5, respectively, in a reaction mixture containing 20–60% strength sulfuric acid aqueous solution until the oxygen content of the produced naphthalene-formaldehyde resin is not greater than 3% by weight and said resin has a softening point in the range of 60–110° C., is soluble in toluene in all proportions and has only limited solubility in butyl acetate, the condensation being completed with the reaction mixture containing sufficient water-immiscible, organic solvent for the naphthalene-formaldehyde condensation resin to provide a liquid resin phase, which solvent is non-reactive with the reaction mixture at the reaction conditions enumerated and is selected from the group consisting of hydrocarbons and halogenated hydrocarbons.

4. A process for producing stable resinous naphthalene-formaldehyde condensation products suitable for lacquers which comprises condensing at a temperature in the range of 50–100° C. naphthalene and formaldehyde at a molar ratio in the range of about 1:1 to 1:1.5, respectively, in a reaction mixture containing 20–60% strength sulfuric acid aqueous solution until the oxygen content of the produced naphthalene-formaldehyde resin is 0.2–1% by weight and said resin has a softening point in the range of 60–110° C., is soluble in toulene in all proportions and has only limited solubility in butyl acetate, the condensation being completed with the reaction mixture containing sufficient water-immiscible, organic solvent for the naphthalene-formaldehyde condensation resin to provide a liquid resin phase, which solvent is non-reactive with the reaction mixture at the reaction conditions enumerated and is selected from the group consisting of hydrocarbons and halogenated hydrocarbons.

5. The process of claim 4 wherein said organic solvent is used in a proportion of about 20–40 parts of solvent per 100 parts of naphthalene.

6. The process of claim 3 wherein said solvent is toluene.

7. The process of claim 3 wherein said organic solvent is added to said reaction mixture at a stage of the condensation process early enough to avoid formation of bodies insoluble in said reaction mixture.

References Cited in the file of this patent

UNITED STATES PATENTS

| | | |
|---|---|---|
| 898,307 | Bohn | Sept. 8, 1908 |
| 2,200,762 | Anderson et al. | May 14, 1940 |

FOREIGN PATENTS

| | | |
|---|---|---|
| 541,770 | Canada | June 4, 1957 |
| 633,923 | Great Britain | Dec. 30, 1949 |
| 666,873 | Great Britain | Feb. 20, 1952 |